Nov. 30, 1954 W. L. CHAUVIN 2,695,449
SUBSURFACE PIPE CUTTER FOR DRILL PIPES
Filed Oct. 28, 1952 3 Sheets-Sheet 1
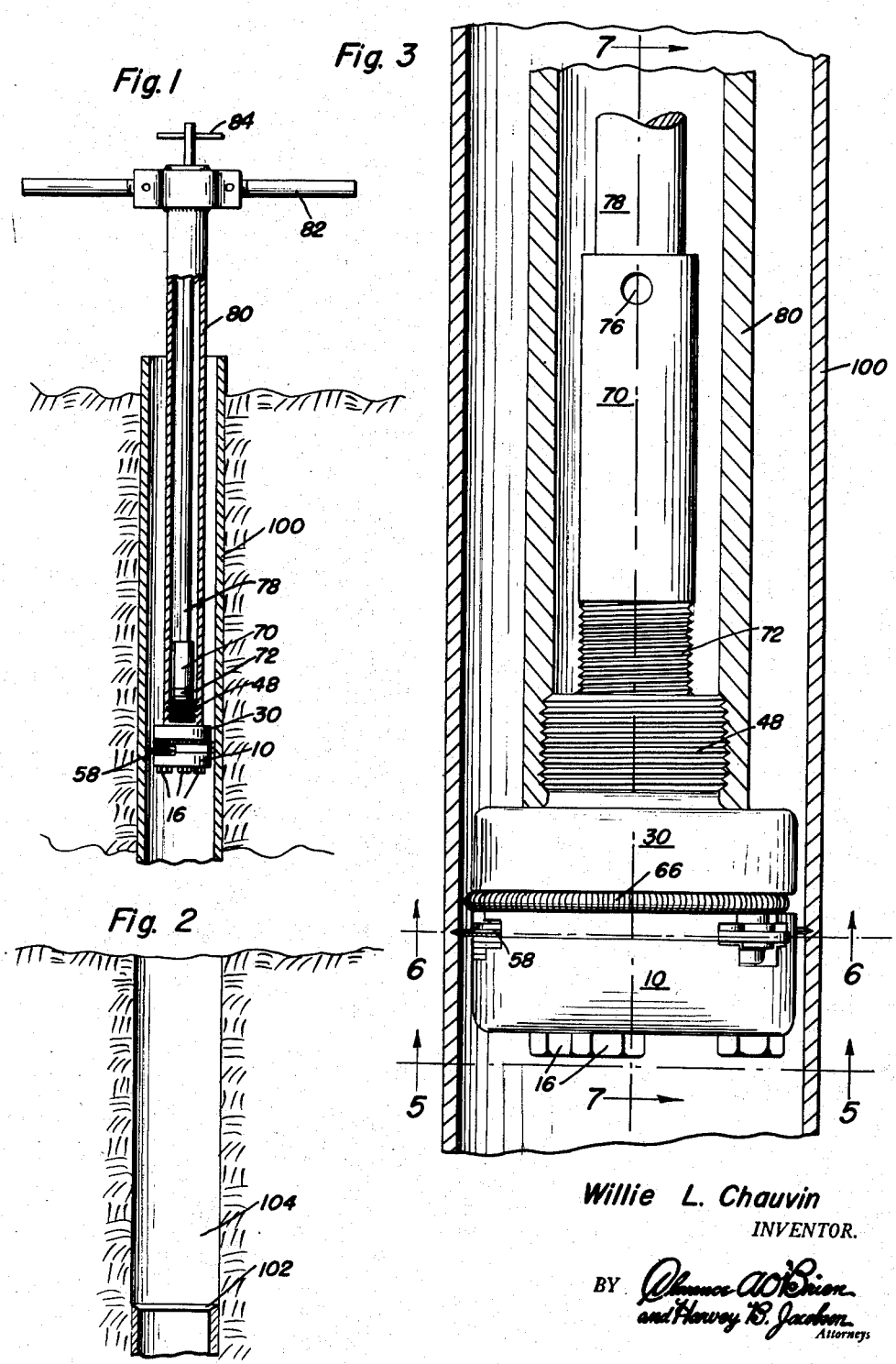
Willie L. Chauvin
INVENTOR.

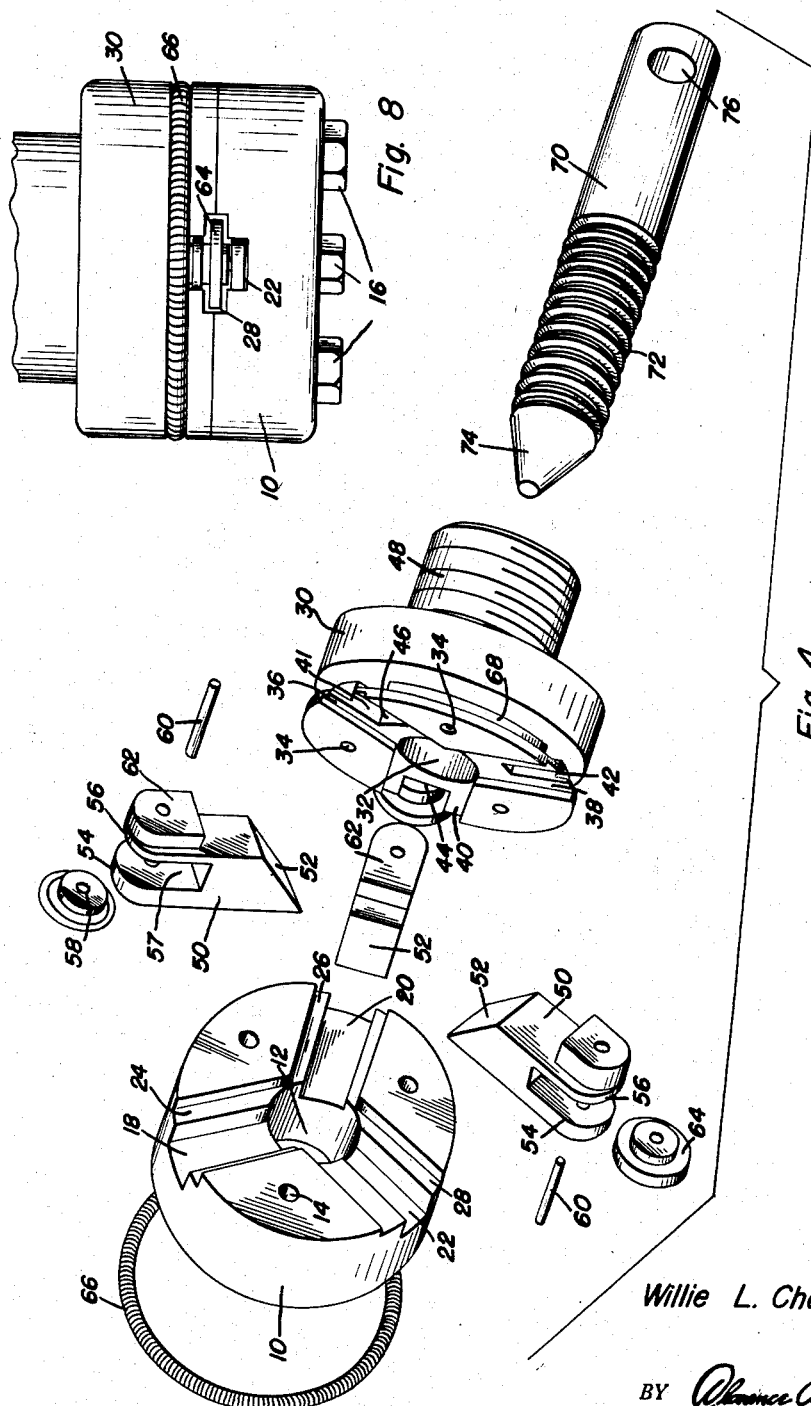

Nov. 30, 1954 W. L. CHAUVIN 2,695,449
SUBSURFACE PIPE CUTTER FOR DRILL PIPES
Filed Oct. 28, 1952 3 Sheets-Sheet 3

Willie L. Chauvin
INVENTOR.

United States Patent Office 2,695,449
Patented Nov. 30, 1954

2,695,449

SUBSURFACE PIPE CUTTER FOR DRILL PIPES

Willie L. Chauvin, Houma, La.

Application October 28, 1952, Serial No. 317,201

4 Claims. (Cl. 30—107)

This invention relates to a pipe cutter used in cutting tubing or pipes from the inside.

In oil fields it is mandatory to cut off drill pipes at least six feet below the surface. It is a common practice in drilling operations or in seismograph work to blow off the top of the pipe or tubing using explosives. It is therefore a primary object of this invention to eliminate the dangers and waste in having to use explosives by providing a tool which may be used to cut off the pipe on the inside so as to enable the upper section of the pipe to be readily withdrawn thus enabling utilization of this pipe while complying with the mandatory requirements of the United States Department of the Interior and other government agencies.

The construction of this invention features the use of two disk-like members having radially extending slots therein in which suitable cutter members are affixed. There is provided a shaft having a conical end which extends through the disk members and engages bevel surfaces on the cutter holders. Thus, the cutter blades which are carried by the holders are forced into the engagement with the inner diameter of the pipe or tubing to be cut. Resilient means comprising a coil spring of torus shape is retained in a groove in one of the disk members and engages the cutting blade holders to urge them inwardly. Thus, when the conical shaft is withdrawn, the blades are pulled inwardly thus permitting the tool to be removed from the tubing or piping being cut.

Still further objects of the invention reside in the provision of a pipe cutter that is strong, durable, highly efficient in operation, simple in construction and manufacture, capable of being readily assembled and disassembled for substitution of new parts for worn out or unserviceable parts, and which pipe cutter can be cheaply and inexpensively produced.

These, together with the various ancillary objects and features of the invention which will become apparent as the following description proceeds, are attained by this pipe cutter, a preferred embodiment of which has been illustrated in the accompanying drawings, by way of example only, wherein:

Figure 1 is a vertical sectional view showing the manner in which the device is used to cut a section of pipe which extends below the surface of the earth;

Figure 2 is a sectional view showing the result obtained from using this invention;

Figure 3 is an enlarged sectional view showing in greatest detail the manner in which the cutting elements of this invention cut the pipe or tubing;

Figure 4 is an exploded perspective view showing in greatest detail the configuration of each of the elements comprising the working portions of this pipe cutter;

Figure 8 is a side elevational view showing the coaction between the torus shaped coil spring and the cutting blade holders.

Figure 5:
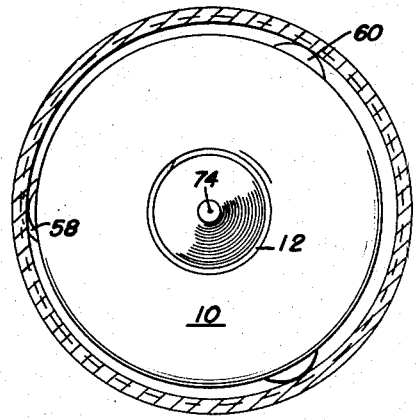
Figure 5 is a horizontal sectional view as taken along the plane of line 5—5 in Figure 3 which shows the bottom plan view of this pipe cutter.
Figure 7:
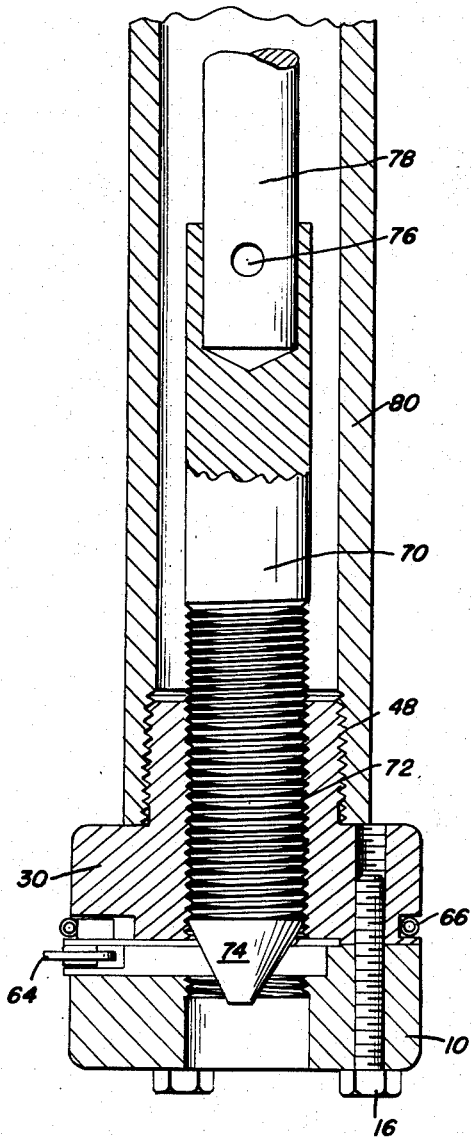
Figure 7 is a vertical sectional view as taken along the plane of line 7—7 in Figure 3 and showing in detail the manner in which the conical end of the shaft engages the cutting blade holders.
Figure 6:
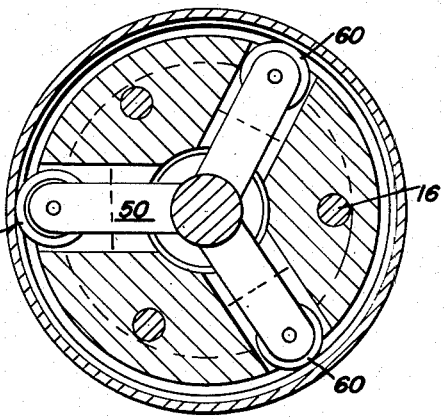
Figure 6 is a horizontal sectional view as taken along the plane of line 6—6 in Figure 3 and showing in particular the construction of the cutting blade holders.

With continuing reference to the accompanying drawings wherein like reference numerals designate similar parts throughout the various views, reference numeral 10 generally designates a disk member which has a central aperture 12 extending therethrough. The disk 10 is further provided with three apertures 14 for reception of bolts 16. Radially extending slots 18, 20, and 22 are formed in the disk 10 and the slots have enlarged portions as at 24, 26 and 28.

A second disk or cylindrical member 30 is provided which has an internally threaded aperture 32 therethrough. Other threaded holes 34 are formed in the cylindrical member 30 for reception of the threaded ends of the bolts 16 which detachably secure the disk 10 the cylindrical member 30. The cylindrical member 30 is further provided with three radially spaced slots 36, 38 and 40 which are adapted to align with the slots 18, 20 and 22 in the disk 10. Recesses 41, 42 and 44 are formed in alignment with the slots 36, 38 and 40 but do not extend all the way in radially. The recesses 41, 42 and 44 form shoulders 46. A threaded boss 48 is integrally formed with the cylindrical member 30 and extends outwardly therefrom.

A plurality of cutting blade holders 50 are provided which are adapted to seat in the aligned recesses 18, 20 and 22 and 36, 38 and 40. These tool holders 50 are each provided with a beveled end portion as at 52 and each have bifurcations 54 and 56 at the outer ends. Between the bifurcations there is a recess 57 in which a rotary cutter blade 58 is adapted to be emplaced and held securely by means of a pin or rivet 60. A guide 62 is attached to the cutting blade holder 50 and is adapted to seat in one of the recesses 41, 42 and 44. It may be desired to use rollers or guides 64 and such may be readily substituted for one or more of the cutting blades 58. A torus shaped coil spring 66 is provided and is adapted to fit into an annular groove 68. The slots 41, 42 and 44 open into the groove 68 and when the spring 66 is positioned it will engage the guide 62 to urge the cutting blade holders 50 inwardly.

A shaft 70 having a cylindrical portion 72 and a conical shaped head 74 is provided. This shaft 70 may be hollow at its upper end and is adapted to be pinned as at 76 to an upwardly extending rod 78. When the shaft 70 is rotated inwardly the conical head 74 will engage the beveled surfaces 52 to force the cutting blade holders outwardly.

Threadedly engaged on the boss 48 is a cylindrical hollow tube 80. A suitable transverse handle 82 may be provided for the cylindrical tube 80. The rod 78 extends upwardly through the tube 80 and is provided with a hand engageable operating member 84. Obviously, the rod 78 and the tube 80 may be made of such length as desired so as to cut a predetermined length of pipe.

In operation, the tool is positioned within the tubing or pipe to be cut and the operating member 84 is rotated so as to actuate the shaft 70 so as to drive the conical head 74 downwardly to engage the beveled surfaces 52. This will drive the cutting blade holders outwardly so as to cause the cutting blade or blades 58 to engage the pipe 100 to be cut. Then, with the blade in cutting engagement with the pipe 100, the handle 82 may be rotated to cause the blade to cut the pipe. Obviously, ever so often it is necessary to tighten on the operating member so as to drive the cutting blade into further engagement with the pipe. A regular cut such as indicated at 102 is thus formed in the pipe and the upper section of the pipe may readily be removed. This leaves a regular opening 104 which may then be closed as desired.

Since from the foregoing, the construction and advantages of this pipe cutter are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

What is claimed as new is as follows:

1. A pipe cutter comprising a disk, spaced radial slots in said disk opening into the periphery thereof, a cylindrical member, spaced radial slots in said member opening into the periphery thereof, an annular groove in said member, said slots in said member being in alignment with said slots in said disk, said disk being detachably secured to said member, recesses in said member in alignment with said slots in said member, recesses in said member in alignment with said slots in said member, cutter blade holders, guides attached to said holders, said guides being positioned in said recesses, said holders being engaged in said aligned slots with said guides in said recesses, means extending through said member urging said holders outwardly and resilient means carried by said member in said groove engaging said guides urging said holders inwardly, a threaded boss on said member, and a hollow tube secured to said boss.

2. A pipe cutter comprising a disk, spaced radial slots in said disk, a cylindrical member, spaced radial slots in said member, an annular groove in said member, said slots in said member being in alignment with said slots in said disk, said disk being detachably secured to said member, recesses in said member in alignment with said slots in said member, cutter blade holders, guides attached to said holders, said holders being engaged in said aligned slots with said guides in said recesses, means extending through said member urging said holders outwardly and resilient means carried by said member in said groove urging said holders inwardly, said resilient means engaging said guides.

3. A pipe cutter comprising a disk, spaced radial slots in said disk, a cylindrical member, spaced radial slots in said member, an annular groove in said member, said slots in said member being in alignment with said slots in said disk, said disk being detachably secured to said member, cutter blade holders, said holder being engaged in said aligned slots, said holders having beveled inner ends, an aperture through said member, said member being internally threaded, a shaft threadedly engaged in said member, said shaft having a conical end portion, said conical end portion engaging said beveled inner ends to urge said holders outwardly, and resilient means carried by said member in said groove urging said holders inwardly, a threaded boss on said member, and a hollow tube secured to said boss.

4. A pipe cutter comprising a disk, spaced radial slots in said disk, a cylindrical member, spaced radial slots in said member, an annular groove in said member, said slots in said member being in alignment with said slots in said disk, said disk being detachably secured to said member, recesses in said member in alignment with said slots in said member, cutter blade holders, guides attached to said holders, said holders being engaged in said aligned slots with said guide in said recesses, said holders having beveled inner ends, an aperture through said member, said member being internally threaded, a shaft threadedly engaged in said member, said shaft having a conical end portion, said conical end portion engaging said beveled inner ends to urge said holders outwardly, and resilient means carried by said member in said groove urging said holders inwardly, said resilient means engaging said guides, said resilient means comprising a circular coil spring, a threaded boss on said member, and a hollow tube secured to said boss.

References Cited in the file of this patent

UNITED STATES PATENTS

| Number | Name | Date |
|---|---|---|
| 401,279 | Barclay et al. | Apr. 9, 1889 |
| 442,125 | Levasseur | Dec. 9, 1890 |
| 540,401 | Nielsen | June 4, 1895 |
| 1,118,494 | Keeney | Nov. 24, 1914 |
| 1,949,598 | Biggs | Mar. 6, 1934 |
| 2,508,539 | Reck | May 23, 1950 |